United States Patent [19]

Andersson

[11] Patent Number: 4,759,242

[45] Date of Patent: Jul. 26, 1988

[54] DEVICE IN IMPACT WRENCHES

[76] Inventor: Sten-Åke Andersson, Växjövägen 4,, 360 24 Linneryd, Sweden

[21] Appl. No.: 20,589

[22] Filed: Mar. 2, 1987

[51] Int. Cl.⁴ .......................................... B25B 23/143
[52] U.S. Cl. ........................................ 81/466; 81/475
[58] Field of Search ................. 81/466, 463, 465, 475, 81/473, 480, 467, 478; 173/93.5, 93.6

[56] References Cited

U.S. PATENT DOCUMENTS

| | | | |
|---|---|---|---|
| 2,160,622 | 5/1939 | Olson et al. | 173/93.6 |
| 3,158,050 | 11/1964 | Shandel | 81/466 |
| 3,203,283 | 8/1965 | Newman | 173/93.6 |
| 3,491,839 | 1/1970 | McIntire | 173/93.6 |
| 4,249,435 | 2/1981 | Villeneuve | 81/480 |

FOREIGN PATENT DOCUMENTS 1815015 12/1968 Fed. Rep. of Germany .

Primary Examiner—Frederick R. Schmidt
Assistant Examiner—Bradley I. Vaught
Attorney, Agent, or Firm—Ostrolenk, Faber, Gerb & Soffen

[57] ABSTRACT

A device at impact wrench, particularly for wheel nuts and wheel bolts and of the type which incorporates a shaft (2) with a handle (3) in one end and a socket in the opposite end (4), whereby the shaft between its ends is provided with a hub (6) about which is rotatably arranged an impact arm (8) which carries weights and is arranged to transfer impact movement to the shaft via stops (7) arranged at the hub, whereby in connection to the hub (6) is arranged members (7, 10) arranged to limit the ability of the impact arm (8) to transfer movement to the shaft (2) which carries the socket in one direction of movement of said impact arm.

2 Claims, 2 Drawing Sheets

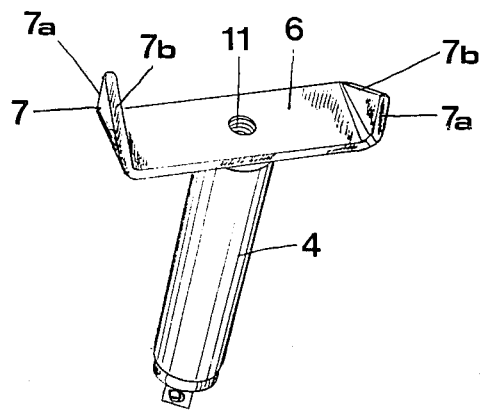
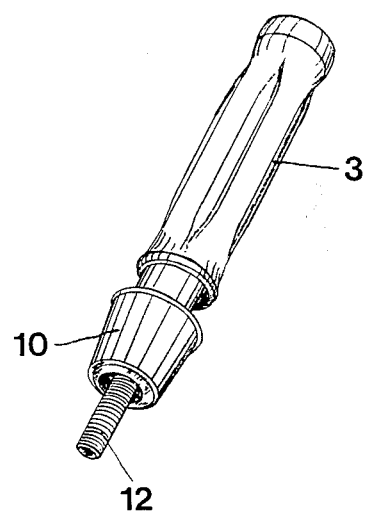
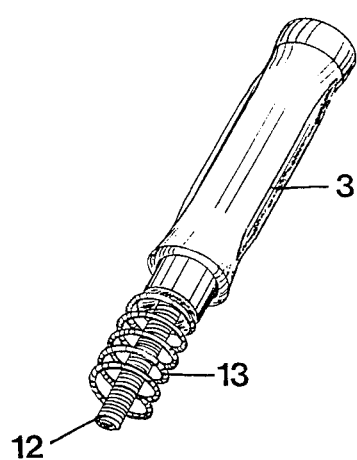

DEVICE IN IMPACT WRENCHES

BACKGROUND OF THE INVENTION

The present invention refers to a device in impact wrenches, particularly for wheel nuts and wheel bolts, and of the type which incorporates a shaft, with a handle in one end thereof and a socket in the opposite end, whereby the shaft between its two ends is provided with a hub, about which is rotatably arranged a transverse arm, which supports weights and which is arranged to transfer impact movement to the shaft via stops arranged on the hub.

Impact wrenches of this design are earlier known in different embodiments, most of which operate well. With the kinetic force obtained when the impact arm is brought to hit against the stops it is possible easily to loosen even very tightly drawn bolts and nuts and also if they have become stuck by rust. All known impact wrenches however have a drawback in that there is a great risk that nuts and bolts may be tightened too hard or even so hard that they burst if the impact effect of the wrench is used when tightening them.

THE PURPOSE AND MOST ESSENTIAL FEATURES OF THE INVENTION

The purpose of the present invention is to provide an impact wrench of the type described hereabove, which has not the above mentioned drawback, but which, when using the movement of the impact arm, will provide tightening to a certain predetermined tightening force only. This has been achieved by the features defined and claimed herein.

DESCRIPTION OF THE DRAWINGS

The invention will hereinafter be further described with reference to embodiments shown in the accompanying drawings.

FIG. 3 shows a portion of the impact wrench according to FIGS. 1 and 2 in smaller scale and in perspective obliquely from above.

FIG. 4 is a view of another part of the impact wrench according to FIGS. 1 and 2 also seen in perspective, and FIG. 5 shows a part corresponding to that shown in FIG. 4 in an alternative embodiment of an impact wrench according the invention.

DESCRIPTION OF THE EMBODIMENTS

Figure 1:
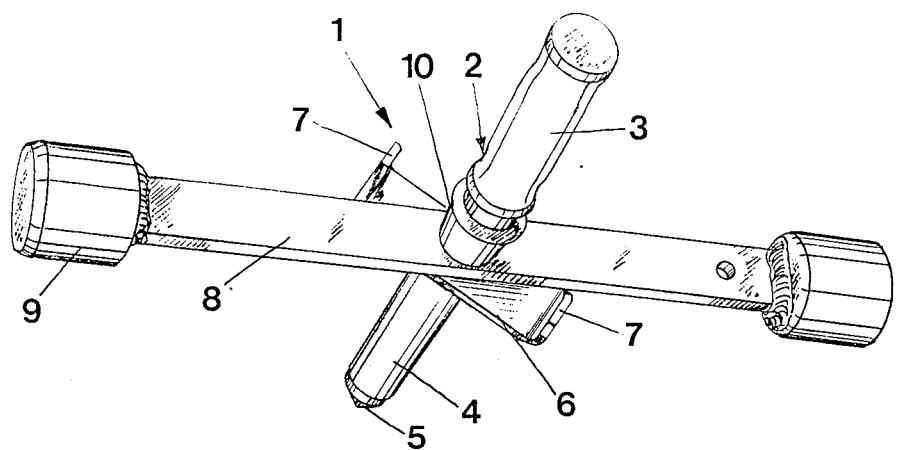
FIG. 1 shows in a perspective view, as viewed obliquely from above, an impact wrench provided with the device according to the invention.
Figure 2:
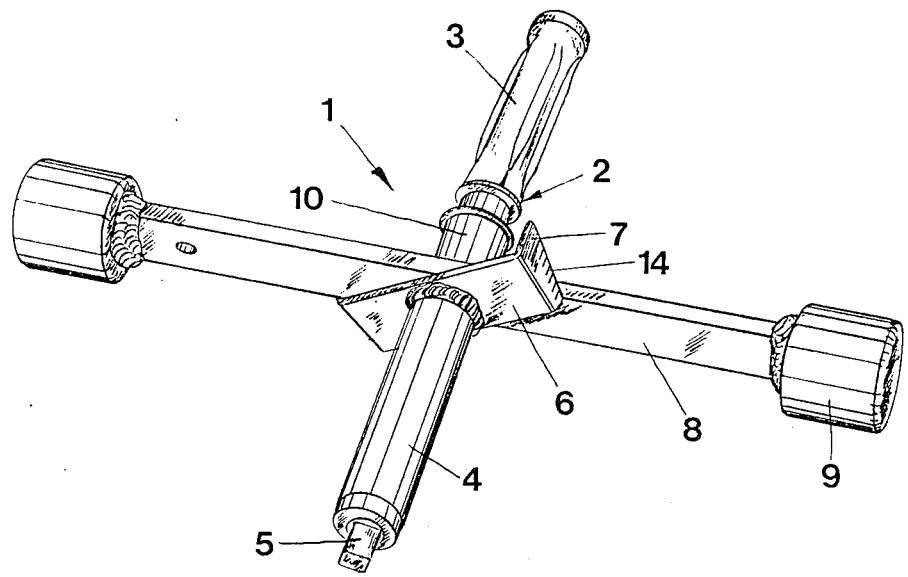
FIG. 2 is a corresponding view of an impact wrench as seen obliquely from below.

FIGS. 1 and 2 show an impact wrench 1 in perspective obliquely from above and from below resp., and which incorporates a shaft 2, with a handle 3 and a lower part 4 having a connecting member 5, which shall carry a socket. The shaft 2 is provided with a short transverse arm 6 arranged perpendicularly to its longitudinal direction, which transverse arm at its ends is provided with flanges 7 which are directed upwards, and which act as stops for an impact arm 8 which is rotatably supported about the shaft and which has a considerably larger longitudinal extension than the transverse arm 6 of the shaft and which at its two ends has weights 9 intended to generate the kinetic force at the moment of the impact arm. A moment limiting device 10 is arranged at the handle 3 immediately above the impact arm 8, and this device 10 is arranged to limit the torque, which can be put on the socket 5, to a predetermined amount, when the impact shaft moves in its tightening direction.

In FIG. 3 is shown in perspective obliquely from above the lower part 4 of the shaft, which is divided into two parts. As can be readily seen from this view, the transverse arm 6 is firmly connected to the lower shaft part 4 and it has between its end flanges 7 a plane, comparatively broad surface against which the impact arm is intended to rest.

From this figure it can also be seen that each end flange 7 has a straight first side surface 7a and a second side surface 7b which is inclined obliquely upwards. The inclined side surfaces are arranged in opposite directions. Thus, the impact arm 8, when rotated about the shaft in one direction, will get an inelastic, direct impact against the flange surfaces 7a whereas in the opposite direction of rotation, it will press against the inclined flange surfaces 7b. On the one hand, this will exert a moment transferring force to the shaft, but on the other hand, this also will give a force component directed upwards, which tends to let the impact arm slide upwards along the inclined surfaces 7b.

The figure also shows how the shaft and the transverse arm 6 are provided with a concentric hole 11, which is threaded and intended to receive a shaft journal 12 having corresponding threads and being a part of the handle 3 shown in FIG. 4 in perspective.

The handle 3 is in the embodiment shown in FIG. 4 provided with a moment limiting device 10 which has an active member designed as a body arranged about the shaft journal 12 and being of an elastically compressible material, e.g. rubber.

In FIG. 5 is shown a handle 3 of the same type as that in FIG. 4, with the difference that it is provided with a moment limiting device 13, the active part of which is formed by a helical spring arranged about the shaft.

Both moment limiting devices 10 and 13 operate in the same manner. In the position of use, the shaft journal 12 of the handle 3 is screwed into the hole 11 in the lower shaft part 4, with the impact arm supported about the shaft journal 12 between the transverse arm 6 and the moment limiting device 10 or 13 resp. When the impact arm rotates in anticlockwise direction it will hit against the straight first flange surfaces 7a of the transverse arm 6, and the entire force will be transferred to the lower part 4 of the wrench. This design is thus intended to be used for loosening right-threaded nuts and bolts.

For tightening such nuts and bolts, the impact arm is rotated in the opposite direction, whereby it will, as said above, be pressed upwards when pressed against the inclined second flange surfaces 7b. Hereby the moment limiting device 10 or 13 resp. will exert resistance at the same time as the device is compressed. When the force is sufficiently great the impact arm will move so high up on the sloping flange surfaces 7b that the impact arm passes completely over the highest point of the flanges 7 and is then pressed down, by the device 10 or 13, to contact against the plane part of the transverse arm 6. Further rotation or tightening movement thereupon start with a tension-free moment limiting device.

By this design it is possible by suitable election of height and inclination of the sloping flanges 7b and of the force of the compressible moment limiting device 10 or 13, to preset the moment at which disconnection takes place in the tightening direction, within rather close ranges. By providing the cooperating parts of each moment limiting device 10 and 13 resp. with indices 14 located in proper places, there can also be obtained at least a rough indication of the actual tightening moment, by using the movement of the impact arm up on the sloping flange surfaces 7b.

For using the impact wrench for left-threaded bolts, a lower part 4 is used having transverse arm flanges, the inclined surfaces of which are arranged in the opposite direction as compared to the embodiment according to FIG. 3.

The invention is not limited to the embodiments shown in the drawings and described in connection therewith, but modifications are possible within the scope of the appended claims.

What I claim is:

1. In an impact wrench, particularly for wheel nuts and wheel bolts, which comprises a shaft with a handle on one end thereof and a socket on the opposite end, the shaft between its ends being provided with a hub;

an impact arm being rotatably supported about said hub, which carries weights and is arranged to transfer impact moment to the shaft via stop members arranged at the hub, the improvement comprising:

the hub having a transverse arm with radial portions projecting in diametrically opposed directions, said transverse arm being at its ends provided with stop means including a pair of stop members, said stop members being directed from said transverse arm toward one end of said shaft, each one of said stop members at one side thereof having a first surface substantially parallel to said shaft, whereas the opposite second surface thereof is inclined obliquely toward said one end of said shaft, for tending to lift the impact arm upon impact against the inclined surface toward said one end of said shaft from engagement with the transverse arm, and further comprising moment limiting means on said shaft adjacent said impact arm, which resists said lifting of said impact arm, for limiting the ability of the impact arm of transferring moment to the shaft carrying the socket in the direction of movement of said impact arm toward said second surface.

2. A device as claimed in claim 1, wherein the shaft of the impact arm is divided into an upper part and a lower part, and has joint means interconnecting the upper part and the lower part thereof, the hub, the impact arm and the moment limiting means being centered about the joint means between said upper and lower shaft parts.

* * * * *